United States Patent
Bushnik et al.

(10) Patent No.: US 7,703,291 B2
(45) Date of Patent: Apr. 27, 2010

(54) CONTAINED ENVIRONMENTAL CONTROL SYSTEM FOR MOBILE EVENT DATA RECORDER

(75) Inventors: Ted G Bushnik, Stittsville (CA); Terry A Bisson, Ottawa (CA)

(73) Assignee: March Networks Corporation, Ottawa, Ontario (CA)

( * ) Notice: Subject to any disclaimer, the term of this patent is extended or adjusted under 35 U.S.C. 154(b) by 1412 days.

(21) Appl. No.: 11/106,515

(22) Filed: Apr. 15, 2005

(65) Prior Publication Data

US 2006/0232891 A1    Oct. 19, 2006

(51) Int. Cl.
F25B 21/02    (2006.01)
(52) U.S. Cl. .......................................... 62/3.2; 62/259.2
(58) Field of Classification Search ................ 62/3.2, 62/259.2, 3.3, 3.7
See application file for complete search history.

(56) References Cited

U.S. PATENT DOCUMENTS

| | | | |
|---|---|---|---|
| 5,065,321 A | | 11/1991 | Bezos et al. |
| 5,676,197 A | * | 10/1997 | Diebold et al. ............ 165/41 |
| 5,704,212 A | * | 1/1998 | Erler et al. ............... 62/3.2 |
| 6,289,678 B1 | | 9/2001 | Pandolfi |
| 6,434,000 B1 | | 8/2002 | Pandolfi |
| 6,595,605 B1 | | 7/2003 | Babcock et al. |
| 2002/0015287 A1 | | 2/2002 | Shao |
| 2002/0051338 A1 | | 5/2002 | Jiang et al. |
| 2003/0067541 A1 | | 4/2003 | Joao |
| 2003/0081128 A1 | | 5/2003 | Kirmuss |
| 2003/0193778 A1 | | 10/2003 | Staiano |
| 2003/0222981 A1 | | 12/2003 | Kisak et al. |

FOREIGN PATENT DOCUMENTS

| | | |
|---|---|---|
| EP | 0402960 A2 | 12/1990 |
| EP | 1235224 A2 | 8/2002 |

OTHER PUBLICATIONS

European Patent Application No. 06721819.8 Search Report dated Jan. 22, 2009.

* cited by examiner

*Primary Examiner*—Melvin Jones
(74) *Attorney, Agent, or Firm*—Curtis Behmann; Borden Ladner Gervais LLP

(57) ABSTRACT

An environmental control system, or data pack, is provided in accordance with embodiments of the present invention. The system allows for audio and video recording on hard drive media in situations where temperature, vibration and humidity would otherwise have prevented the use of such technology. The system can be used in conjunction with an event recorder for use in motor vehicles, trains and the like. The environmental control system includes a thermoelectric module connected to the hard drive and to a housing. The thermoelectric module is for transferring heat between the hard drive and the housing in response to an applied voltage in order to maintain a hard drive temperature within a hard drive operable temperature range. The vehicle operating temperature range includes temperatures outside the hard drive operable temperature range.

15 Claims, 9 Drawing Sheets

CONTAINED ENVIRONMENTAL CONTROL SYSTEM FOR MOBILE EVENT DATA RECORDER

FIELD OF THE INVENTION

The present invention relates generally to environmental control systems. More particularly, the present invention relates to an environmental control system for a hard disk drive.

BACKGROUND OF THE INVENTION

Much of the rail industry is self-regulated with respect to equipment that is required on board. Currently, many trains include event recorders that measure all of the operator inputs to the vehicle. The United States Federal Railroad Administration (FRA) defines an event recorder as a device, designed to resist tampering, that monitors and records data on train speed, direction of motion, time, distance, throttle position, brake applications and operations (including train brake, independent brake, and, if so equipped, dynamic brake applications and operations) and, where the locomotive is so equipped, cab signal aspect(s), over the most recent 48 hours of operation of the electrical system of the locomotive on which it is installed. The event recorders are similar to "black boxes" in airplanes. Most on-board event recorders record all of this information into (solid state) memory. Data from the solid-state memory can be uploaded if it must be analysed or reviewed.

Recording technologies for use in rail applications must be incredibly rugged. Environmental problems that must be dealt with include heat, vibration, humidity, electrical disturbances, etc. Solid-state memory can be used for such applications to mitigate some of these effects. However, there is a need to store more and more information in event recorders, including data types that take up a lot of memory. For example, providing 48 hours of video data recording can generally take about 60 gigabytes of storage. Solid-state memory is presently 70 times the cost of hard disk storage; therefore, there is a commercial advantage if hard drives could be used.

Typical hard drive technology can only operate between 5 degrees and 55 degrees Celsius. Train temperatures can be well outside this temperature range. Typical hard drive technology also does not perform well if subjected to vibration, and will fail when exposed to high levels of humidity.

It is, therefore, desirable to provide a recording (storage) system that is suitable for use in the rail industry, or in other environments where a vehicle's operating temperature (and possibly vibration levels, and humidity levels) exceed the specified hard drive operating range.

SUMMARY OF THE INVENTION

It is an object of the present invention to obviate or mitigate at least one disadvantage of previous event recorders, or recording systems.

A storage (or recording) system is provided that is suitable for use in the rail industry, or in other environments where vehicle temperature ranges include temperatures that are outside traditional component operating temperature ranges.

In a first aspect, the present invention provides a contained environmental control system for a hard drive. The hard drive is for mounting to a vehicle, and the vehicle operates within a vehicle operating temperature range. The system includes a housing for enclosing the hard drive. The system also includes a thermoelectric module coupled to and provided within the housing and for coupling to the hard drive. The thermoelectric module is for transferring heat between the hard drive and the housing in response to an applied voltage in order to maintain a hard drive temperature within a hard drive operable temperature range. The vehicle operating temperature range includes temperatures outside the hard drive operable temperature range. The hard drive operable temperature range can be within the vehicle operating temperature range.

An active thermoelectric controller can be provided for actively drawing heat away from the hard drive and out of the housing. The active thermoelectric controller can include a heat sink coupled to the thermoelectric module and to the housing for dissipating heat from the thermoelectric module to the housing. The thermoelectric module can be a thermoelectric cooler for drawing heat from the hard drive to the heat sink. The active thermoelectric controller can include a fan.

The system can further include a mechanical vibration isolator coupled to the hard drive and to the housing for reducing vibrational effects on the hard drive in order to maintain operation within a hard drive vibration limit. The mechanical vibration isolator can be a wire rope isolator.

The system can further include an insulating container, with the housing and the thermoelectric module being provided within the insulated container. A desiccant pack can be provided within the insulating container.

A thermal spreader can be provided in contact with the hard drive and the thermoelectric module for facilitating thermal conduction between the hard drive and the thermoelectric module. A thermal transfer material can provided between the thermal spreader and the thermoelectric module and/or between the thermal spreader and the heat sink. An air gap sealing means can be provided on the periphery of an upper surface of the heat sink. Temperature control logic can be provided, including a means for applying a voltage to the thermoelectric module. A means can be provided for activating the temperature control logic in response to a detection of a housing temperature in excess of an upper device operating temperature. A temperature sensor can be located on the thermal spreader for detection of the temperature of the thermal spreader, as an approximation of the temperature of the hard drive.

In another aspect, the present invention provides a mobile event recorder data pack for use in a vehicle, the vehicle operating within a vehicle operating temperature range. The data pack includes a main processing module, and a contained environmental control system for a hard drive. The system includes a housing for enclosing the hard drive. The system also includes a thermoelectric module coupled to and provided within the housing and for coupling to the hard drive. The thermoelectric module is for transferring heat between the hard drive and the housing in response to an applied voltage in order to maintain a hard drive temperature within a hard drive operable temperature range. The vehicle operating temperature range includes temperatures outside the hard drive operable temperature range. The hard drive operable temperature range can be within the vehicle operating temperature range. The data pack also includes a backplane system for interfacing the main processing module with the contained environmental control system.

The mobile event recorder data pack can include an event recorder interface for coupling the mobile event recorder data pack with an event recorder. The mobile event recorder data pack can include means for selecting an external time synchronization source.

In a further aspect, the present invention provides a mobile event data recorder for use in a vehicle, the vehicle operating within a vehicle operating temperature range. The mobile event data recorder includes an event recorder clock source, a main processing module, and a contained environmental control system for a hard drive. The contained environmental control system includes a housing for enclosing the hard drive. The system also includes a thermoelectric module coupled to and provided within the housing and for coupling to the hard drive. The thermoelectric module is for transferring heat between the hard drive and the housing in response to an applied voltage in order to maintain a hard drive temperature within a hard drive operable temperature range. The vehicle operating temperature range includes temperatures outside the hard drive operable temperature range. The hard drive operable temperature range can be within the vehicle operating temperature range.

The mobile event data recorder further includes a backplane system for interfacing the main processing module with the contained environmental control system. The mobile event data recorder also includes a time synchronizer for synchronizing the digital video recorder with the event recorder clock source.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
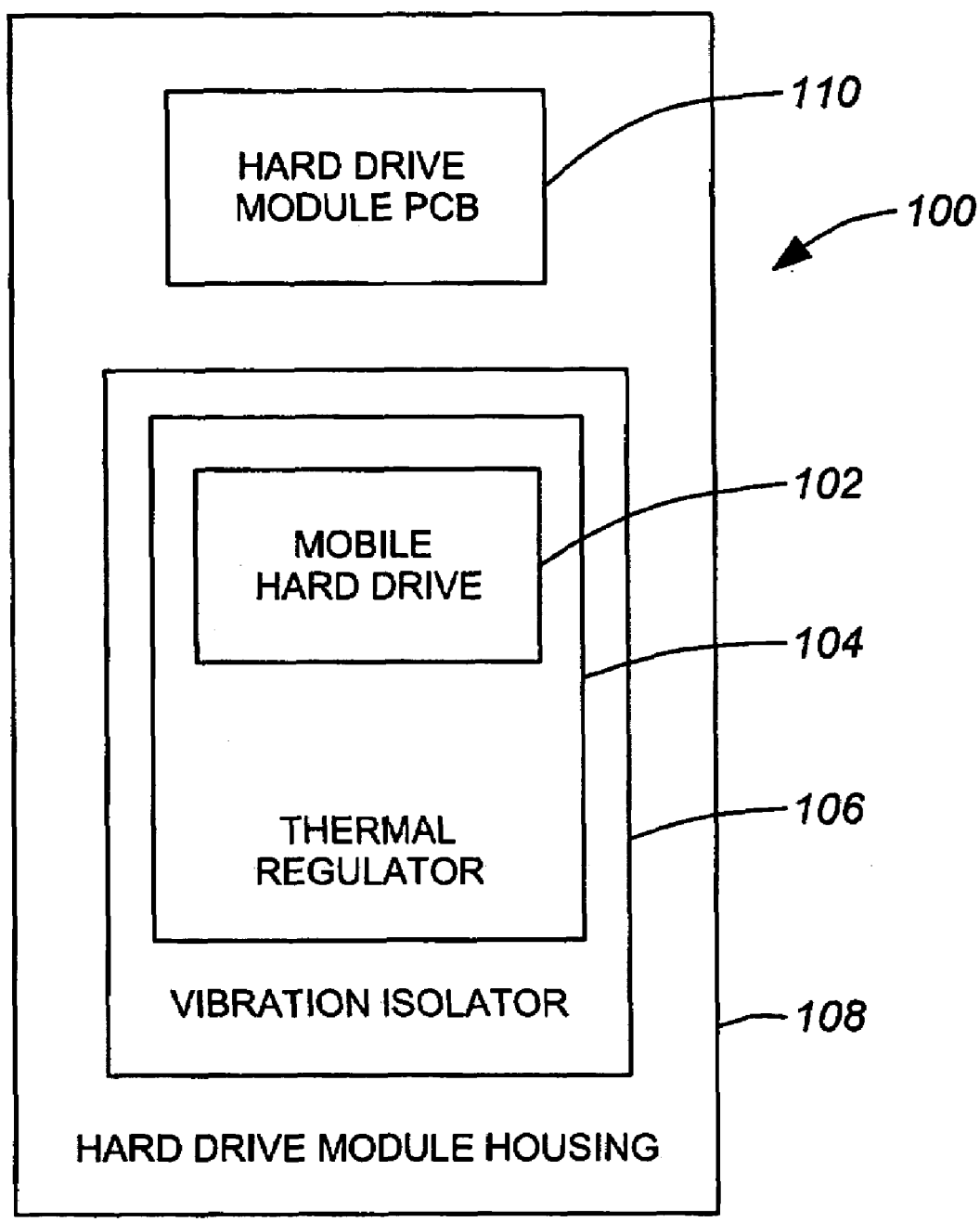
FIG. 1 is a block diagram of a contained environmental control system, or hard drive module, according to an embodiment of the present invention.

Generally, the present invention provides an environmental control system that allows for audio and video recording on hard drive media in situations where temperature, vibration and humidity would otherwise have prevented the use of such technology. The system can be used in conjunction with an event recorder for use in motor vehicles, trains and the like. The environmental control system includes a thermoelectric module connected to the hard drive and to a heat sink. The thermoelectric module is for transferring heat between the hard drive and the heat sink in response to an applied voltage in order to maintain a hard drive temperature within a hard drive operable temperature range. The heat is then removed from the heat sink and module by a fan. The vehicle operating temperature range includes temperatures outside the hard drive operable temperature range. An insulating container is preferably provided around the hard drive to improve the cooling capability of the system and as a seal to keep out humidity. The thermal control system can be mounted on vibration isolators to mitigate vibration effects of the environment.

The term "contained environmental control system", or "self-contained environmental control system", as used herein represents a system for mitigating effects of the surrounding environment on a hard drive, or similar component.

The term "mobile event recorder data pack" as used herein represents a system for permitting use of a contained environmental control system according to an embodiment of the present invention with an event recorder, such as those known in the art, in order to provide enhanced functionality.

The term "mobile event data recorder" as used herein represents a system for enabling the storage/recording of event data, and may not necessarily itself include the actual means for capturing the data to be recorded. The terms LDVR (locomotive digital video recorder) and MVEDR (motor vehicle event data recorder) represent specific, non-limiting, exemplary embodiments of a mobile event data recorder according to an embodiment of the present invention. A mobile event data recorder according to an embodiment of the present invention is an improvement over existing event recorders, and includes a contained environmental control system and the components of a mobile event recorder data pack.

The term "hard drive operable temperature range" as used herein represents a range of temperatures within which a hard drive is operable, such as a temperature range specified by a manufacturer for preferred use.

The term "vehicle operating temperature range" as used herein represents a range of temperatures within which a vehicle is expected to operate. In an exemplary case where a contained environmental control system is provided at or near an exterior surface of the vehicle, this range can be the range of environmental temperatures within which the vehicle is expected to function. A particular example of this is the range of outdoor temperatures on a cold winter day, such as when the contained environmental control system is provided on (or in the trunk of) a law enforcement vehicle. In an exemplary case where a contained environmental control system is provided within a particular location of the vehicle, this range is the range of temperatures that can be expected within that particular location of the vehicle. A particular example of this is the range of temperatures typically observed within a locomotive cabin.

A storage (or recording) system is provided that is suitable for use in the rail industry, or in other environments where vehicle temperature ranges include temperatures that are outside traditional component operating temperature ranges.

Embodiments of the present invention provide a self-contained environmental control system for use with a hard drive recording apparatus. The mitigation of effects caused by the surrounding environment can be approached from many points of view. It can be tackled from a vibrational perspective in which the entire unit is isolated. An advantage of the self contained system approach is that it results in a tamper-proof design that is isolated within the constructs of the unit chassis. The self-contained environmental control system according to the present invention can be used with standard 2½" hard drive technology, such as laptop hard drive technology, which can range in the order of 60 gigabytes and up. The system according to embodiments of the present invention can protect the hard drive unit from temperature variations, humidity variations, high vibration environments, and can protect it electrically by virtue of the design. This system provides electrical protection to survive electrical disturbances as encountered in rail vehicle environments. The system includes a battery back up if system power fails. Embodiments of the present invention allow the exiting of the file system gracefully, not letting electrical disturbances affect the system. All power conditioning is done inside the box. Embodiments of the present invention provide advances in the electromechanical treatment of the hard drive within the system.

Removable Hard Drive Module Subsystem

FIG. 1 is a block diagram of a contained environmental control system, or hard drive module, 100 according to an embodiment of the present invention. The control system 100 is for controlling the environmental effects to which a hard drive, or mobile hard drive, 102 is subjected. Though the hard drive is required for operation, the system 100 can be sold with or without the hard drive.

A thermal regulator 104 controls the hard drive temperature so that it is maintained within a hard drive operable temperature range. The hard drive operable temperature range is smaller than, and falls within, a vehicle operating temperature range. The measurement of a housing temperature is typically a suitable approximation of the vehicle temperature. In any event, the system 100 allows for operation of the hard drive within its operable temperature range, regardless of the fact that a surrounding temperature (either measured as housing temperature or vehicle temperature) may fall outside of the hard drive operable temperature range.

A vibration isolator 106 is preferably provided for reducing vibrational effects on the hard drive 102. These components are enclosed within a hard drive module housing, or mechanical enclosure, 108. A control system interface 110, such as a hard drive module printed circuit board (PCB), is preferably provided to facilitate communication with an external unit, such as a backplane subsystem of an event recorder data pack according to an embodiment of the present invention.

The system, or module, 100 is removable, such as for use in a LDVR system. The LDVR application can impose restrictions on the quality (highest), frame rate (highest), and retention period (2 days). These restrictions necessitate a preferred minimum of 60 Gb storage, and therefore the use of standard mobile hard drive technology.

Mobile Hard Drive

The hard drive 102 can be partitioned into a minimum of two partitions. This will facilitate the event of a block write or read failure where a repair is required. A means can be provided for executing an automatic periodic online hard drive diagnostic, which will be initiated upon: a preset periodic interval; or a unit power cycle. A means is provided to preferably initiate an automatic disk repair sequence when the online diagnostic detects a block error.

Temperature Control

A particular challenge is that the system is operating in an ambient temperature outside of the unit (i.e. vehicle temperature) of up to 65 degrees C., while the relevant ambient temperature within the system box itself (i.e. housing temperature) is about 10 degrees higher than that, i.e. up to 75 degrees C. The hard drive case itself is preferably kept about 15 degrees lower than the housing temperature. An approach using a thermoelectric module, or cooler, according to an embodiment of the present invention is provided in order to deal with this issue.

Although it may be possible to attempt to cool the entire box or unit, the amount of power that would be required to do this is significant and would require a large heat sink. However, by using a self-contained environmental control system that is used at the lowest common denominator, this limits the amount of power that needs to be dumped into the system to cool it, approximately 6 watts. All components of this system are preferably designed for low power use since they are conduction cooled. The box itself, without the external peripherals, typically dissipates about 30 watts of power or less. To cool the entire box would require power in the range of hundreds of watts in order to get the relative temperature down to the required range. Cooling the entire system would also be a challenge since the entire system would have to be sealed, somewhat like a refrigerator, and possibly insulated. Therefore, instead of using aluminum as a casing for the box, it would likely be necessary to use some sort of insulating material. By self-containing all of the delicate environmental control components, the ruggedness of the box is maintained externally, power is contained and a sufficient amount of protection is provided for this application.

Hard Drive Temperature Control System

Hard drive temperature can be managed within an operational envelope as specified by the manufacturer, also referred to as the hard drive operable temperature range.

Figure 2:
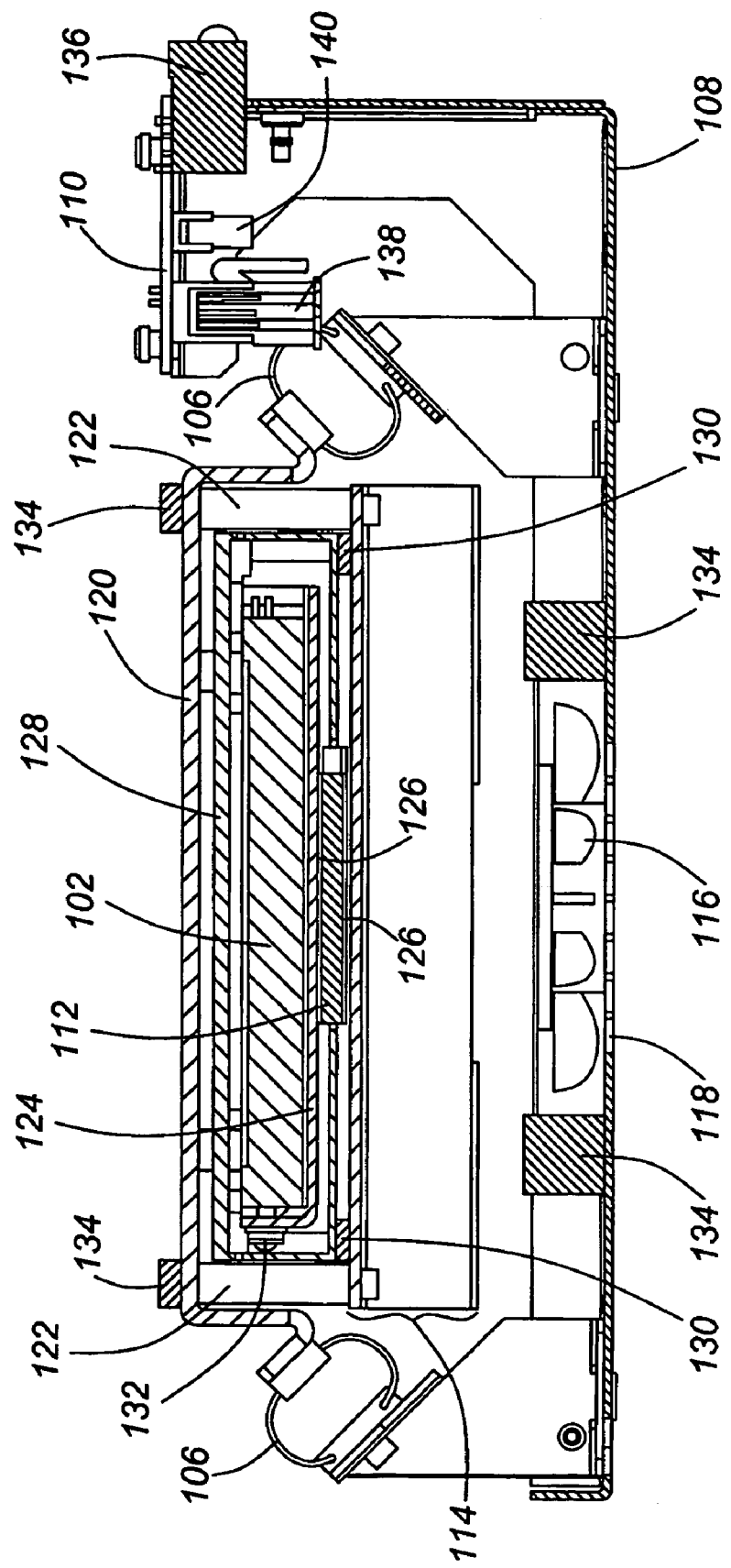
FIG. 2 is a side view of a contained environmental control system according to an embodiment of the present invention, showing a component stack-up.

FIG. 2 is a contained environmental control system according to an embodiment of the present invention, showing a component stack-up. The thermal regulator 104 includes a thermoelectric module 112. The thermoelectric module 112, sometimes referred to as a thermoelectric cooler or Peltier cooler, is a semiconductor-based electronic component that functions as a small heat pump. Operation of such a module 112 is based on the Peltier effect, according to which there is a heating or cooling effect when electric current passes through two dissimilar conductors. A voltage applied to the free ends of two dissimilar materials creates a temperature difference. By applying a low voltage DC power source to a thermoelectric module, heat will be moved through the module from one side to the other. One module face, therefore, will be cooled while the opposite face simultaneously is heated. The heat will be moved (or 'pumped') in the direction of charge carrier movement throughout the circuit, with the charge carriers actually transferring the heat. So, depending on the direction of current flow, the junction of the two conductors will either absorb or release heat. Therefore, this phenomenon can be reversed by a change in the polarity (plus and minus) of the applied DC voltage. Consequently, a thermoelectric module may be used for both heating and cooling thereby making it highly suitable for precise temperature control applications.

A practical thermoelectric module 112 comprises two or more elements of semiconductor material that are connected electrically in series and thermally in parallel. These thermoelectric elements and their electrical interconnects typically are mounted between two ceramic substrates. The substrates serve to hold the overall structure together mechanically and to insulate the individual elements electrically from one another and from external mounting surfaces. Some thermoelectric modules used as Peltier Effect coolers can be made of Bismuth Telluride ($Bi_2Te_3$), or other suitable materials.

The thermal regulator 104 can include an active thermoelectric controller, or control module. In some embodiments, this can alternatively be referred to as an active cooling system. The active cooling system can comprise a heat sink 114 including an active component, such as a fan 116, that actively draws heat away from the heat sink and out of the housing. An electronic thermostat controller, which can include software monitoring, can maintain proper operating temperature. A fault monitor is preferably provided to monitor the thermal controller for faults. Where proper operating temperatures cannot be maintained, the system ensures that the unit does not operate. Of course, in situations where the thermoelectric module 112 is heating the hard drive 102, the fan 116 typically does not draw heat out of the housing. The housing 108 preferably defines perforations 118 through which air being drawn by the fan 116 can exit the housing.

An upper constraint plate 120 is connected to the heat sink 114 with spacers 122 and is fastened by a fastening means, such as machine screws, provided at the bottom of the spacers to constrain or sandwich the hard drive 102 within the various elements of the system according to embodiment of the present invention. The upper constraint plate 120 is shown in the embodiment of FIG. 2 to wrap around the spacers 122 for connection to the vibration isolators 106 on either side of the hard drive 102.

A thermal spreader 124, or aluminum plate, is provided preferably in contact with the hard drive 102. The thermal spreader 124 is used to move heat through conduction. The thermal spreader 124 is preferably in contact with the sides of the hard drive 102, the sides of the hard-drive typically themselves being an aluminum casing. The juncture of the two aluminum surfaces provides for a good thermo-conductive path.

The thermoelectric module 112 then draws heat from the thermal spreader plate 124. A thermal transfer material 126 is preferably provided between the plate 124 and the thermoelectric module 112 in order to help fill any gap between the material and provide a good conductive path, as well as permitting compression of the two surfaces together without concern for potential damage to the element. There is also the advantage of compensating for minor variances in measurements and sizes of the various elements due to manufacturing tolerances. The material also preferably provided between the thermo electric module and the heat sink. Under vibration or motion, the material or filler will protect the components.

The hard drive and plate can then be enclosed in an insulating container 128, such as a plastic housing, case or canister. This insulating container 128 provides an insulation barrier by containing a pocket of air between the hard drive and the housing. The insulating container is placed around the hard drive 102 and thermal spreader 124. An insulating container sealing means (not shown), such as an aluminum foil or tape, is preferably provided around the edge of the insulating container 128 to advantageously seal the unit from moisture. A desiccant pack (shown as 142 in FIG. 3) is preferably provided within the insulating container for absorbing moisture. The desiccant pack can be provided anywhere in the insulating container, such as on an upper surface of the hard drive 102. An air gap sealing means 130, such as closed cell foam, is also provided preferably on the periphery of the upper surface of the heat sink 114 in order to prevent air and moisture from entering into the system, creating an air gap around the hard drive area. This air gap area provides insulation for the hard drive, since air is a good insulator when it cannot move. The thermal transfer material, or thermally conductive gap filler material, 126 can be any suitable material, such as Berquist filler. The air gap sealing means 130 can be a polyethylene foam used for sealing against moisture and to fill the gap between the lower portion of the insulating container and the heat sink.

One or more temperature sensors, or thermocouples, 132 are provided for measuring the temperature of the thermal spreader 124, which is assumed to be very close to the temperature of the hard drive 102. This measured temperature is provided to control electronics as an input upon which a decision can be based, or action can be taken.

A plurality of bumpers 134 can be provided in order to contain elements of the system within a specific envelope of motion. Bumpers 134 are shown in possible locations such as above the upper constraint plate 118 and on either side of the fan 116. The bumpers 134 can prevent contact of functional elements with the housing when the system is subjected to vibration and movement.

The control system interface, or circuit board, 110 can include a number of connectors, such as: a backplane interface connector 136; a thermal regulator component connector 138, which can include connectors for the thermoelectric module, the thermocouples, and the fan; and a hard drive connector 140. Cables are then used to connect these various components.

Figure 3:
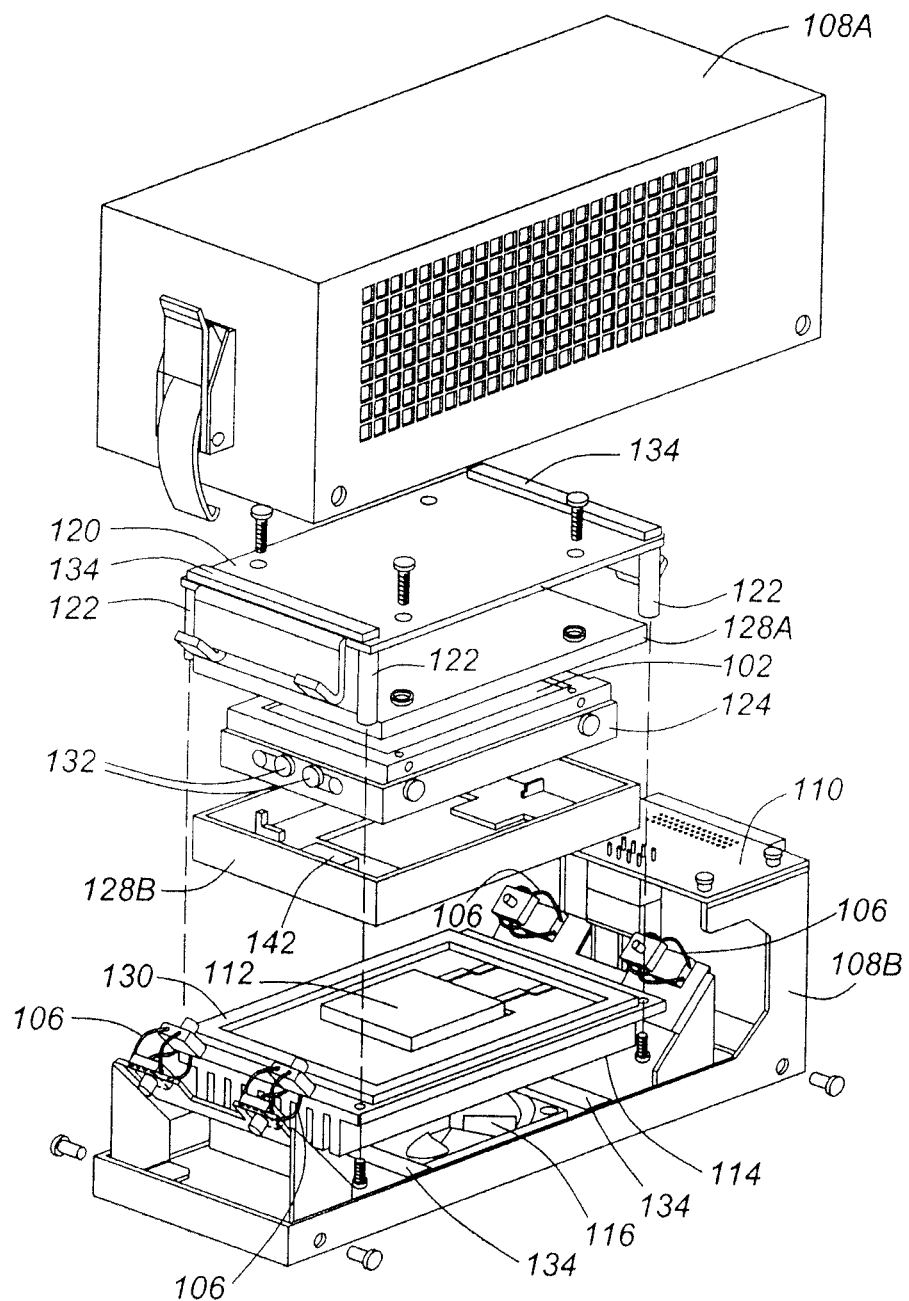
FIG. 3 is an exploded view of a contained environmental control system according to an embodiment of the present invention.

FIG. 3 is an exploded view of a contained environmental control system according to an embodiment of the present invention. The environmental control system according to an embodiment of the present invention preferably includes a vibration isolator 106 to provide vibration damping to allow operation of the hard drive within manufacturer specified limits. In the embodiment shown in FIG. 3, four vibration isolators are provided, two on either end of the hard drive 102. The vibration isolator 106 in FIG. 3 is implemented as a wire rope isolator. These vibration isolators 106 provide vibration isolation in 3 axes such that the hard drive essentially "floats" while the train is moving and vibrating. Wire rope isolators can effectively damp vibrations above 10 Hz. Other means can be provided to damp vibrations below 10 Hz, if this is seen as a desirable feature. Other possible vibration isolators can be made of rubber, neoprene, steel, spring shocks, etc. Wire rope isolators are quite common partly due to their improved damping capabilities when compared to springs.

In addition to providing a clearer view of many of the elements shown in FIG. 2, the embodiment shown in FIG. 3 illustrates the fact that certain elements can themselves include more than one element. For instance, the housing 108 is shown in FIG. 3 as including an upper housing portion 108A and a lower housing portion 108B. The insulating container 128 is shown in FIG. 3 as including an upper insulating container portion 128A and a lower insulating container portion 128B. The lower insulating container portion 128B is shown as defining an opening, or thermoelectric module receiving area. The air gap sealing means 130 is shown in an exemplary embodiment provided on the periphery of upper surface of the heat sink 114 in order to prevent air and moisture from entering into the system, creating an air gap around the hard drive area.

Also shown in FIG. 3 is an exemplary location of a desiccant pack 142. As described earlier, the desiccant pack 142 is preferably provided within the insulating container for absorbing moisture, such as in a location that is in contact with a lower surface of the hard drive 102 when the system is assembled together. FIG. 3 also shows bumpers 134 in locations above the upper constraint plate 118 and on either side of the fan 116, where the bumpers preferably extend along the entire width of the unit. Also shown is the fact that four spacers 122 are preferably provided.

High Temperature Operation and Control

Temperature control logic, such as an electronic thermostat control, for controlling the thermoelectric module 112 can physically be located inside the housing 108. Alternatively, it can be located outside of the control system 100, i.e. in the mobile event recorder data pack or main unit. If the logic is outside of the control system, data communication is performed via the control system interface 110. The temperature control logic can be provided in hardware, firmware, or in software, or a combination thereof. If some or all is stored in software, the software is stored on a computer-readable memory and, when executed, can perform desired temperature control steps. The temperature control logic can include means for applying a voltage (or current) to the thermoelectric module; the voltage can be applied at different polarities, depending if heating or cooling is desired. The temperature control system maintains the minimum operating temperature for the operating environment.

Figure 4:
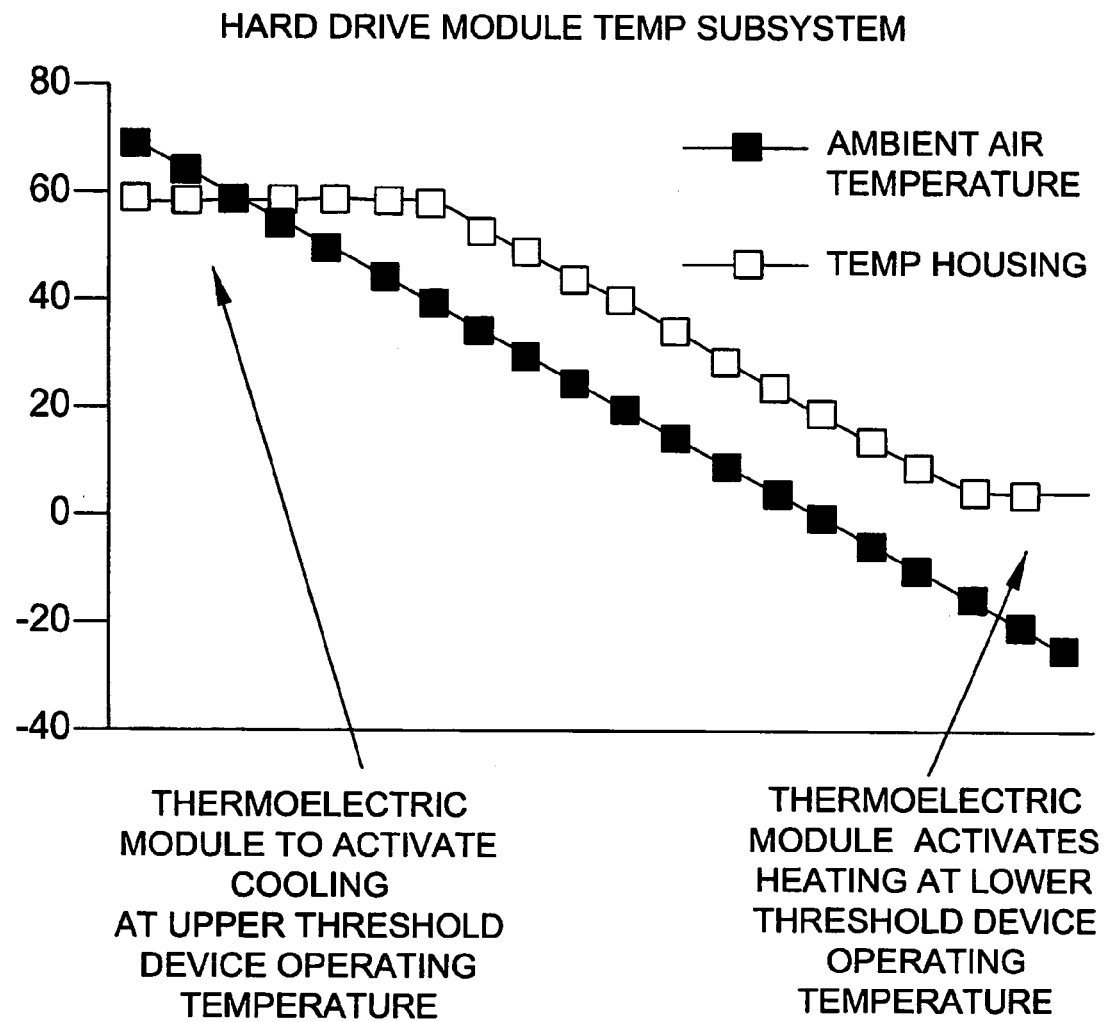
FIG. 4 is a graph illustrating the effects of a temperature control subsystem of a hard drive module according to an embodiment of the present invention.

In terms of temperature control steps, the temperature control system preferably activates, i.e. begins cooling, when the temperature of the housing reaches an upper device operating temperature, such as 60 degrees C. This limitation of high temperature cooling is preferable in order to avoid humid conditions resulting in condensation on the hard drive. To help avoid the condensation problem, the plastic insulating case can be sealed and also can comprise a desiccant pack within. An exemplary device operating temperature range is outlined in the graph of FIG. 4, which illustrates the effects of a temperature control subsystem of a hard drive module according to an embodiment of the present invention. The operating range can be defined by upper and lower device operating temperatures, with cooling and heating being initiated if a measured temperature exceeds the upper and lower thresholds, respectively.

The measured temperature can be obtained by one or more temperature sensors. The temperature sensor(s) can be located on the housing in order to obtain a close estimation of hard drive case temperature. The temperature control subsystem is preferably designed for on/off thermostat control with hysteresis (i.e. no proportional control is expected to be required). A temperature status signal (Heater/Cooler on/off) can be monitored.

Prior to attempting spin-up, the hard drive can be cooled to a case temperature inside hard drive operational limits. Cooling is preferably limited to less than 10 degrees per minute to avoid thermal shock. The hard drive cooler should be operational after hard drive spin-up. Cooler design should preferably accommodate a temperature gradient of a minimum of 10 degrees per hour.

Hysteresis can be built into the temperature control systems to ensure proper control system limits are maintained, and the unit is not subjected to constant turn on/shutdown sequences. During operation, software can monitor SMART (Self Monitoring, Analysis and Reporting Technology) temperature measurements from the hard drive to determine if a high temperature shutdown sequence should be executed. In a particular embodiment, software can monitor for a SMART temperature equal to or exceeding +65 degrees C. for a constant period of 10 minutes to determine if high temperature shutdown is required. Once a temperature shutdown has occurred, the delayed temperature startup can ensure that the unit does not power up again until acceptable temperature limits exist. Note that operation is preferably implemented as failsafe, such that if software crashes, a hardware watchdog will reboot unit and a delayed startup sequence will execute.

Therefore, embodiments of the present invention provide a pre-heat stage on turn-on. The hard drive temperature is then maintained above a particular threshold operating temperature, such as 10 degrees C. The thermoelectric module 112, such as a Peltier cooler, is preferably employed in both such modes. A voltage is applied so that the polarity of the cooler is reversed to use it as a heater when the temperature is cold, the polarity is flipped once again to use it as cooler when the environment is hot. The Peltier cooler allows for the hard drive case to be cooled or heated beyond the limits of the ambient air temperature within the unit.

In general, hard drive failure rates decrease when the hard drive is operated at a cooler operating temperature. This has been shown in known statistical analyses. Therefore, in preferred embodiments, instead of waiting until the operating temperature reaches 60 degrees C. before cooling, it is possible to decrease the temperature at which control is introduced, thereby increasing the life of the hard drive.

HDD Mechanical Enclosure

The hard drive enclosure, or housing, 108 preferably completely encloses all electromechanical components. Preferably, no electronic components are exposed, with the exception of the blind mate connector, or cable. The hard drive module can include a secondary securing means (i.e. thumb screws) to secure it inside the Hard Drive module compartment if required for vibration and/or functionality.

The housing 108 preferably has a finger-hold to allow extraction. Module insertion force is preferably approximately equal to the connector insertion force. Module connector mating is preferably not subject to the support of the full weight of the hard drive module subsystem (the intent is to avoid pin damage). The PCB is preferably isolated mechanically to avoid stress on the connector leads in high vibration environments. The enclosure material can be any suitable material, such as Aluminum or Steel. An enclosure fabrication method for the HDD chassis is preferably performed using bent sheet stock.

According to an embodiment of the present invention, access to the inside of the housing can be via a hinged door with key-lock system. A micro-switch can be provided on the compartment door to initiate a unit shutdown sequence. A door gasket can provide enough spring-back force on the door, requiring a key to be in the locked and engaged position to maintain the micro-switch in the closed position.

Preferably, the key cannot be removed unless the hard drive module door is locked. Hard drive module door cannot be closed if the lock is in the locked position. Unlocking and opening of the door preferably activates a micro-switch and initiates a fast file shutdown sequence and a unit shutdown.

According to an embodiment of the present invention, a means is provided for copying all configuration changes to the hard drive at run time (not just startup and shutdown) to prevent losing the configuration (for investigation purposes) in the case of a failure (e.g. train crash). A shutdown sequence preferably does not exceed 5 to 10 seconds. Efforts will be made to have the DVR shutdown quickly in order to minimize the time window between the time where the key is turned off and the time the HD module could be removed.

If the key lock is turned off before the software has started running, the unit will preferably shut off immediately. Once the micro switch is triggered, the unit will continue with the shut down regardless of the switch state. A fabrication method for the door can preferably include bent sheet stock (possible cost reduction with casting). A door/hinge is preferably provided with key lock on the front of chassis, though can be provided in alternate location(s). An IP-60 seal is preferably located between door and chassis.

In embodiments of the present invention, the hard drive is preferably provided in an insulating container, such as a plastic canister. Besides its use as an insulator, as mentioned earlier, it is also used to deal with humidity issues. The entire mechanical enclosure can be sealed to provide protection against dust particles entering the system but not changes in humidity. All circuit cards are preferably coated in order to prevent rail dust and/or surface moisture to effect performance.

The unit design can address moisture and condensation (particularly associated with the cooling aspect and relative humidity). A sealed system and desiccant pack combination are preferably provided. The desiccant is preferably provided within the plastic insulation, such that there is a plastic case around the hard drive to seal the subsystem, and then a desiccant pack is inside the insulation.

In summary, the LDVR should have a lockable, removable storage module. The hard drive module is housed in a compartment, and access can be via a hinged door with key-lock system. The key is preferably not removable from the lock if the locking mechanism is in the Open position. The DVR preferably does not operate if the removable hard drive module is not installed in the unit. When the key is turned to the Open position, the hard-drive module should power down for removal. All locking mechanisms preferably use a common master key. The unit can support a single 2.5" mobile hard drive.

Subsystem Construction and Design Parameters

There are certain preferable design parameters that can be applied to the subsystems of the environmental control system according to embodiments of the present invention. To meet vibration specifications, Epoxy or fasteners can be used as secondary mechanisms to secure high profile or high mass components. To reduce requirement for fastening, the design can reduce usage of high profile components (i.e. large electrolytic capacitors, vertical coin cell holder, etc). Mounting standoff locations are preferably located on minimum of 5 inch spacing on perimeter of the PCBs, and 5 inch radially measured on inner portion of PCBs to reduce possibility of flex due to shock and vibration. Connectors can preferably include a screw down option to avoid lead stress and possible solder joint problems in high vibration environments.

Humidity requirements make it preferable that all circuit card assemblies are conformal coated. This can impose the following restrictions: circuit card test coverage should guarantee limited rework requirement since rework after conformal coating will be limited; circuit card design should consider test strategies to allow for functional test after conformal has been applied (rework and repair process); masking patterns should be defined for each circuit card assembly—since masking is expensive, strategies such as plugs to cover exposed connectors should be employed; designs should attempt to reduce requirement for any masking.

In other words, according to an embodiment of the present invention there is provided a contained environmental control system for a hard drive. The hard drive is for mounting to a vehicle, and the vehicle operates within a vehicle operating temperature range. The system includes a housing for enclosing the hard drive. The system also includes a thermoelectric module coupled to and provided within the housing and for coupling to the hard drive. The thermoelectric module is for transferring heat between the hard drive and the housing in response to an applied voltage in order to maintain a hard drive temperature within a hard drive operable temperature range. The vehicle operating temperature range includes temperatures outside the hard drive operable temperature range. The hard drive operable temperature range can be within the vehicle operating temperature range.

An active thermoelectric controller can be provided for actively drawing heat away from the hard drive and out of the housing. The active thermoelectric controller can include a heat sink coupled to the thermoelectric module and to the housing for dissipating heat from the thermoelectric module to the housing. The thermoelectric module can be a thermoelectric cooler for drawing heat from the hard drive to the heat sink. The active thermoelectric controller can include a fan.

The system can further include a mechanical vibration isolator coupled to the hard drive and to the housing for reducing vibrational effects on the hard drive in order to maintain operation within a hard drive vibration limit. The mechanical vibration isolator can be a wire rope isolator.

The system can further include an insulating container, with the housing and the thermoelectric module being provided within the insulated container. A desiccant pack can be provided within the insulating container.

A thermal spreader can be provided in contact with the hard drive and the thermoelectric module for facilitating thermal conduction between the hard drive and the thermoelectric module. A thermal transfer material can be provided between the thermal spreader and the thermoelectric module and/or between the thermal spreader and the heat sink. An air gap sealing means can be provided on the periphery of an upper surface of the heat sink. Temperature control logic can be provided, including a means for applying a voltage to the thermoelectric module. A means can be provided for activating the temperature control logic in response to a detection of a housing temperature in excess of an upper device operating temperature. A temperature sensor can be located on the thermal spreader for detection of the temperature of the thermal spreader, as an approximation of the temperature of the hard drive.

Mobile Event Recorder Data Pack

Figure 5:
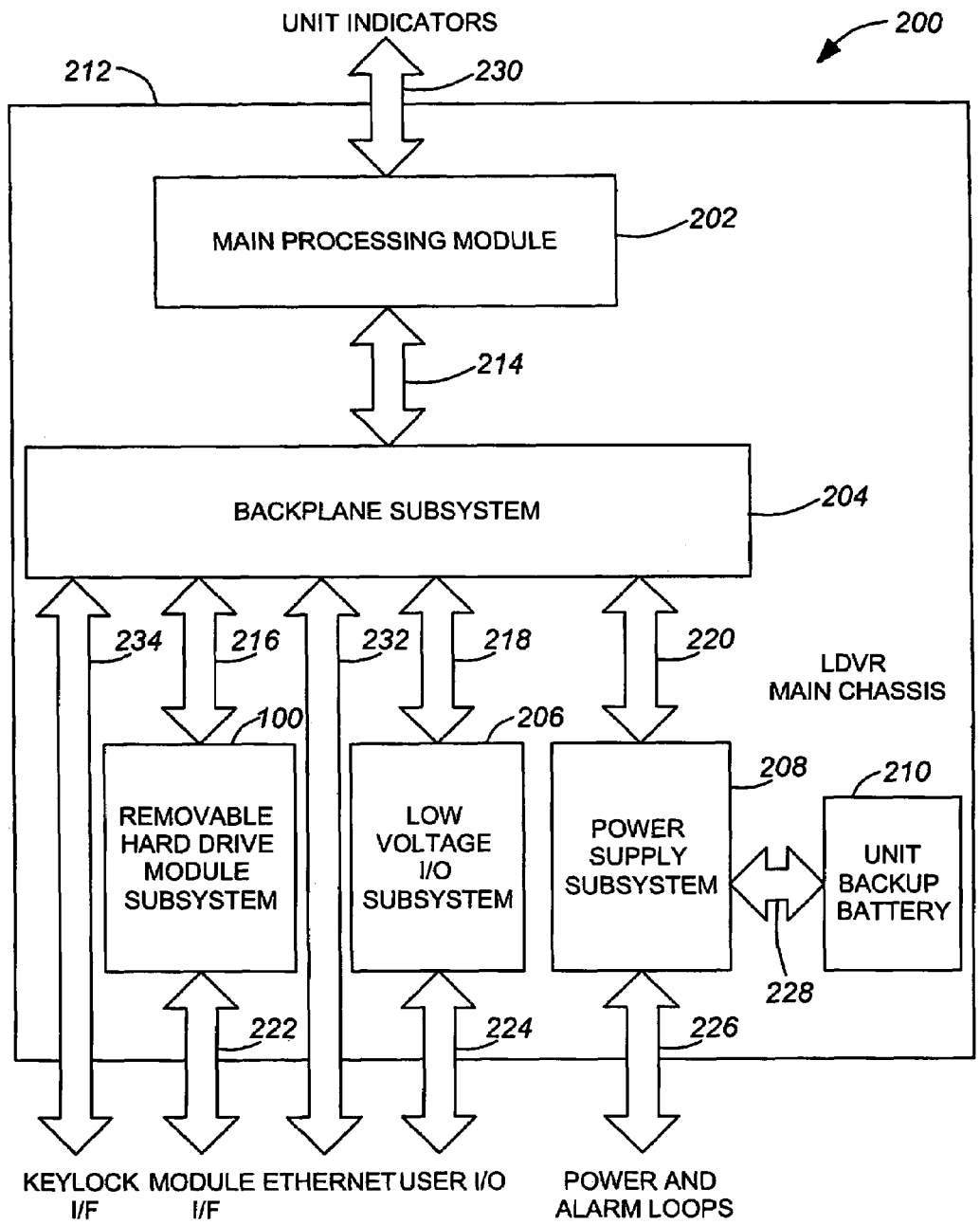
FIG. 5 is a block diagram illustrating a mobile event data recorder according to an embodiment of the present invention.

FIG. 5 is a block diagram illustrating a mobile event recorder data pack 200 according to an embodiment of the present invention. The mobile event recorder data pack 200 preferably includes the following subsystems: Main Processing Module Subsystem 202; Backplane Subsystem 204; Removable Hard Drive Module Subsystem 100; Low Voltage I/O Subsystem 206; Power Supply Subsystem 208; Unit Backup Battery Subsystem 210; and Main Chassis 212.

The mobile event recorder data pack 200 also preferably includes the following interfaces, which can be physical and/or logical interfaces: Main Processing Module to Backplane Subsystem Interface 214; Backplane Subsystem to Removable Hard Drive Module Subsystem Interface 216; Backplane Subsystem to Low Voltage I/O Subsystem Interface 218; Backplane Subsystem to Power Supply Subsystem Interface 220; Removable Hard Drive Module User Interface 222; Low Voltage I/O Subsystem User Interface 224; Power Supply Subsystem User Interface 226; Unit Battery Backup Interface 228; Unit Indicator LED User Interface 230; Ethernet User Interface 232; and Key-lock Interface for Hard Drive Module 234.

The external characteristics of the mobile event recorder data pack, or LDVR, will be discussed, followed by general considerations relating to the data pack, then a discussion of some individual components.

Main Chassis

Figure 6:
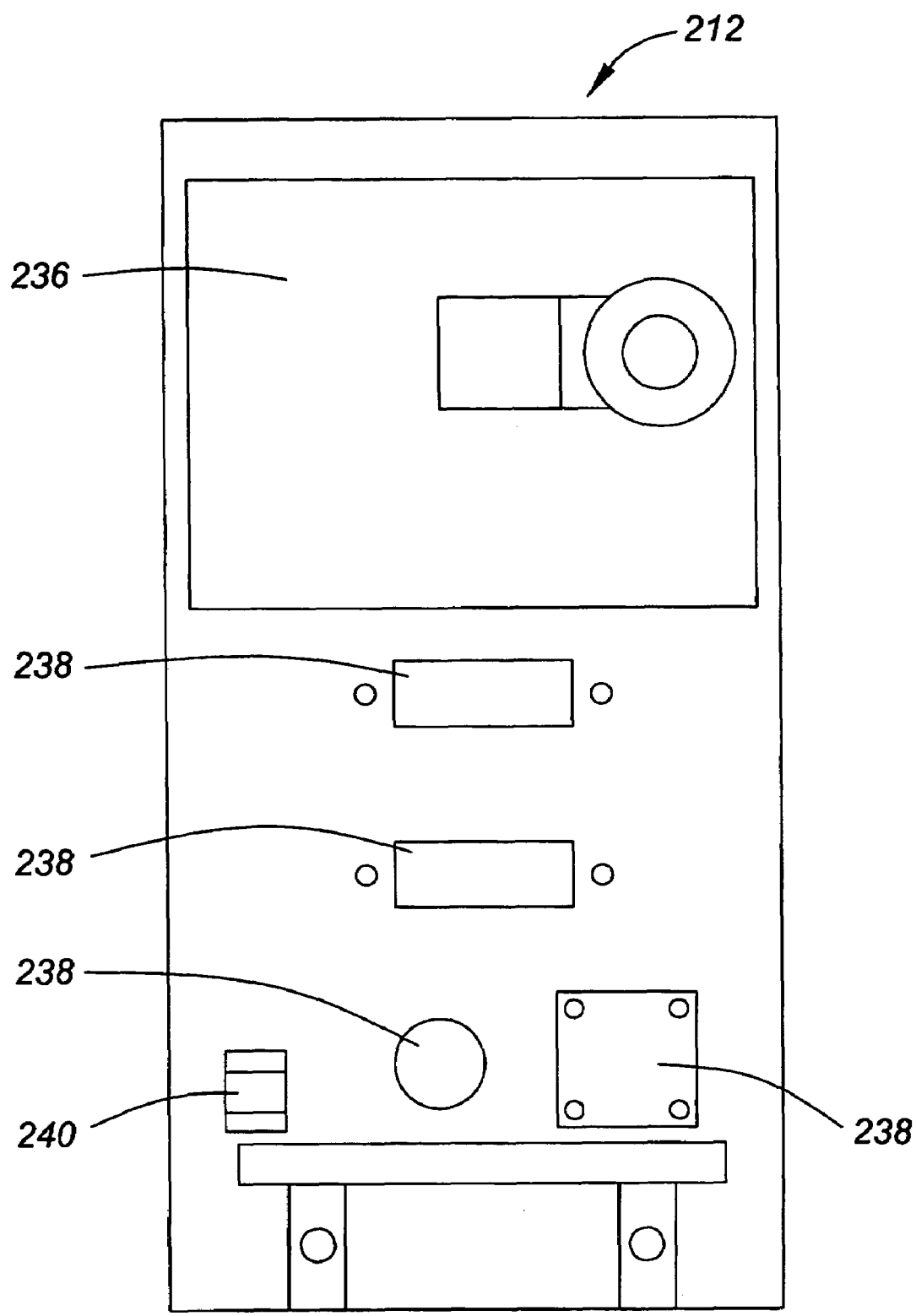
FIG. 6 is a front view of a chassis for mobile event recorder data pack according to an embodiment of the present invention.

FIG. 6 is a chassis 212 for a mobile event recorder data pack 200 according to an embodiment of the present invention. The chassis itself can include a compartment 236 for a contained environmental control system, or removable hard drive module, according to an embodiment of the present invention. The compartment 236 is shaped and constructed so as to mate with the removable hard drive module 100 (not shown in FIG. 6). The chassis can further include a plurality of connectors 238 (shown as J1, J2, J3 and J4), and a plurality of status LEDs 240. The status LEDs 240 can interface with the main processing module 202 via Unit Indicator LED User Interface 230, as shown in FIG. 5.

An LDVR Main chassis preferably complies to the locomotive standard unit modular concept unit LSI 4-MCU form factor which specifies outer dimensions, features and installation method. A particular example of outer dimensions according to an embodiment of the present invention is: 11.50 inches long, 9.25 inches height and 4.88 wide. The standard designates certain areas of the external outline as reserved spaces for interface to the LSI 4 mounting bracket. It is important to note a presently preferred embodiment for use with the LDVR uses a format specific to the rail industry. A mounting bracket is required for all installations.

Specific design items provided on the main chassis 212 can include a side access panel (cover) to facilitate assembly and servicing of the unit. The main chassis and cover can be secured by machine screws.

The chassis is preferably designed with IP-60 ingress protection features. In addition, consideration can be given to EMI (Electro Magnetic Interference) with gasketing design (electrical conductivity). Some such features are as follows: a seal located between cover and main chassis; a seal around each I/O connector; a seal located between removable hard drive module door and main chassis; removal of side access panel to service Unit Backup Battery is acceptable; aluminum bent sheet stock as chassis material.

In terms of operating conditions for the chassis and mobile event recorder data pack in general, an operating input supply voltage can be 74 VDC. This includes power as well as alarm inputs which are required to operate at up to 135 volts.

A particular embodiment is provided as an LDVR having a mobile video recorder with the following functional summary: a locomotive standards enclosure format and vehicle mounting mechanism; operates directly from standard locomotive power; has 4 video input channel interfaces each providing current limited +12V to cameras, and operating over CAT-5 twisted pair cable; has 2 audio input channel interfaces each providing current limited +12V to audio boxes, and operating over CAT-5 twisted pair cable; has 2 isolated RS-232 ports, each providing isolated current limited +5V to peripherals. One channel has a special repeater option to allow the LDVR to listen to the Wabtec Event Recorder data-stream; one Ethernet interface for interface to the Onboard Railway Computer; has 4 optically isolated alarm loops; one serial interface for provisioning and field diagnostics; and contains a removable hard drive module system. Of course, this is a description of a particular embodiment and variations in some or all of these features are possible.

With respect to DVR software functionality supported by the LDVR, the following features can be provided, either as code means or as a computer-readable medium storing statements and instructions which, when executed, cause a processor to perform steps to provide the following features: support for new time synchronization sources; support for incoming packets identifying a locomotive ID to be recorded with the video stream; support for incoming packets providing secondary clock data; support for the new number of physical inputs (*.dat changes).

The shutdown delay can be set to 30 seconds. This delay is used when main power to the DVR has been removed, and the DVR is delaying a safe shutdown while running on battery power.

LDVR Environmental Performance

An LDVR according to an embodiment of the present invention preferably complies with a number of environmental performance requirements, such as one or more of the following: Random Vibration: 1.5 Grms, 10-200 Hz, 4 hours/axis, 3 axes; Sinusoidal Vibration: 7.6 mm p-p 5-10 Hz, 1.5 g p@10-300 Hz, 4 hours/axis, 3 axes; Operating Shock: 20 g, 11 ms, terminal peak 3 shocks in each direction/axis, 3 axes; Non-Operating Shock: 40 g, 6 ms, terminal peak 3 shocks in each direction/axis, 3 axes; High Temperature Operational: 7 days @60 degrees Celsius; Low Temperature Operational: 7 days @-25 degrees Celsius; High Temperature Storage: 7 days @70 degrees Celsius; Low Temperature Storage: 7 days @-25 degrees Celsius; and Humidity: 40+/-5 degrees Celsius @95 percent Relative Humidity for 96 hours.

With respect to EMI Requirements, the system preferably complies with the WRE EMI Standard 212.10. This includes one or more of the following: Hi-pot of 74V circuits -1.2 kV; Electrostatic Discharge—IEC 1000-4-2, level 4 (8 kV contact, 15 kV air); Radiated Immunity—IEC 1000-4-3 (15 V/m); Surge—IEC 1000-4-5, level 3 (2 kV, line to line and line to earth); Electrical Fast Transients—IEC 1000-4-4 (4 kV); Conducted Emissions—FCC 15.107 Class A, GETS 41A296300AD; Radiated Emissions—GETS 84A204793, MIL-STD-462D Product Installation The unit is to be as simple to mount into a locomotive as possible and comply with industry standard equipment mounting practices. As per the LSI 4 MCU specification, the unit is to be mountable into the LSI bracket system through either the cup screw down version, or screw in front bracket version.

Figure 7:
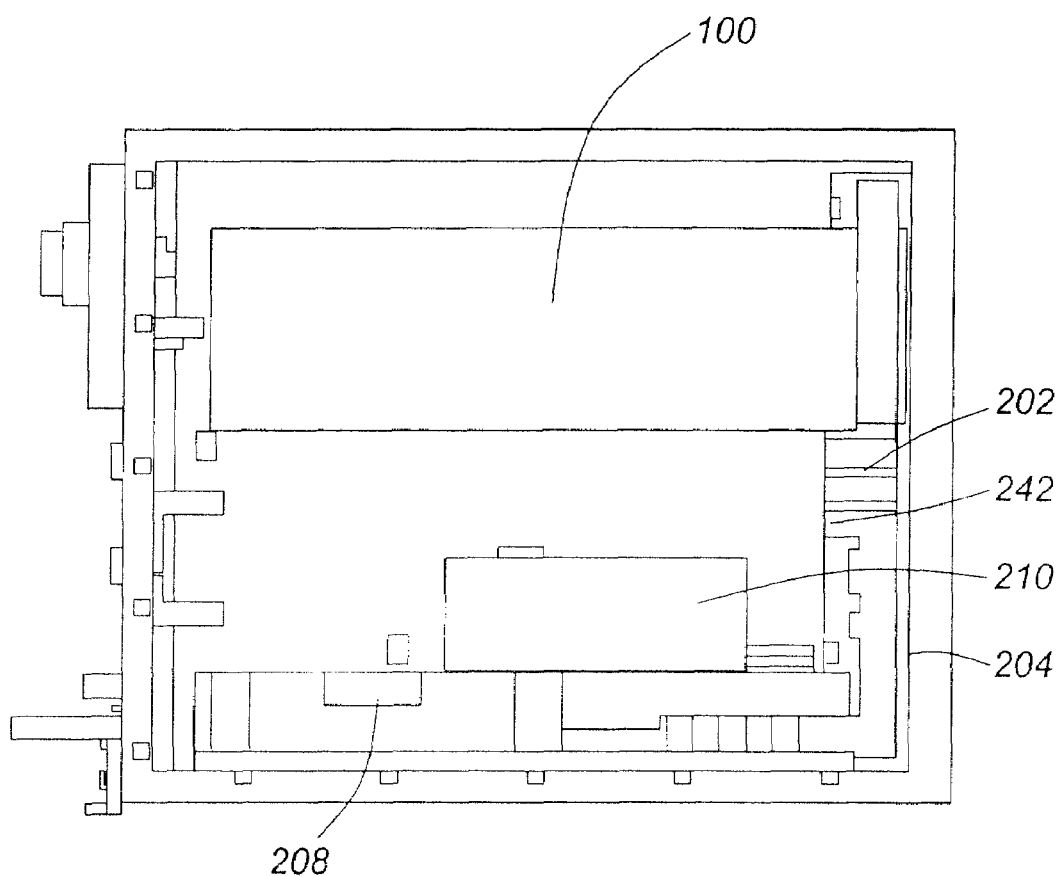
FIG. 7 is a cutaway view of the chassis of FIG. 6.

FIG. 7 is a cutaway view of the chassis 212 of FIG. 6. FIG. 7 illustrates an embodiment in which the following elements can be seen in an exemplary, though non-limiting, configuration: main processing module subsystem 202; backplane subsystem 204; hard drive module subsystem 100; power supply subsystem 208; unit backup battery 210, alternatively referred to as a battery pack for power supply subsystem; and thermal spreader 242 for the main processing module. The thermal spreader 242 is used to draw heat from hot components and release it to the wall of the main chassis through conduction. In an embodiment, there is one thermal plate for the power supply and one for the main card. The plate is preferably made of aluminum because of its excellent thermally conductive properties. The plate can be interfaced with the components with a non electrically conductive, thermal conductive gap filler.

Backplane Subsystem

Figure 8:
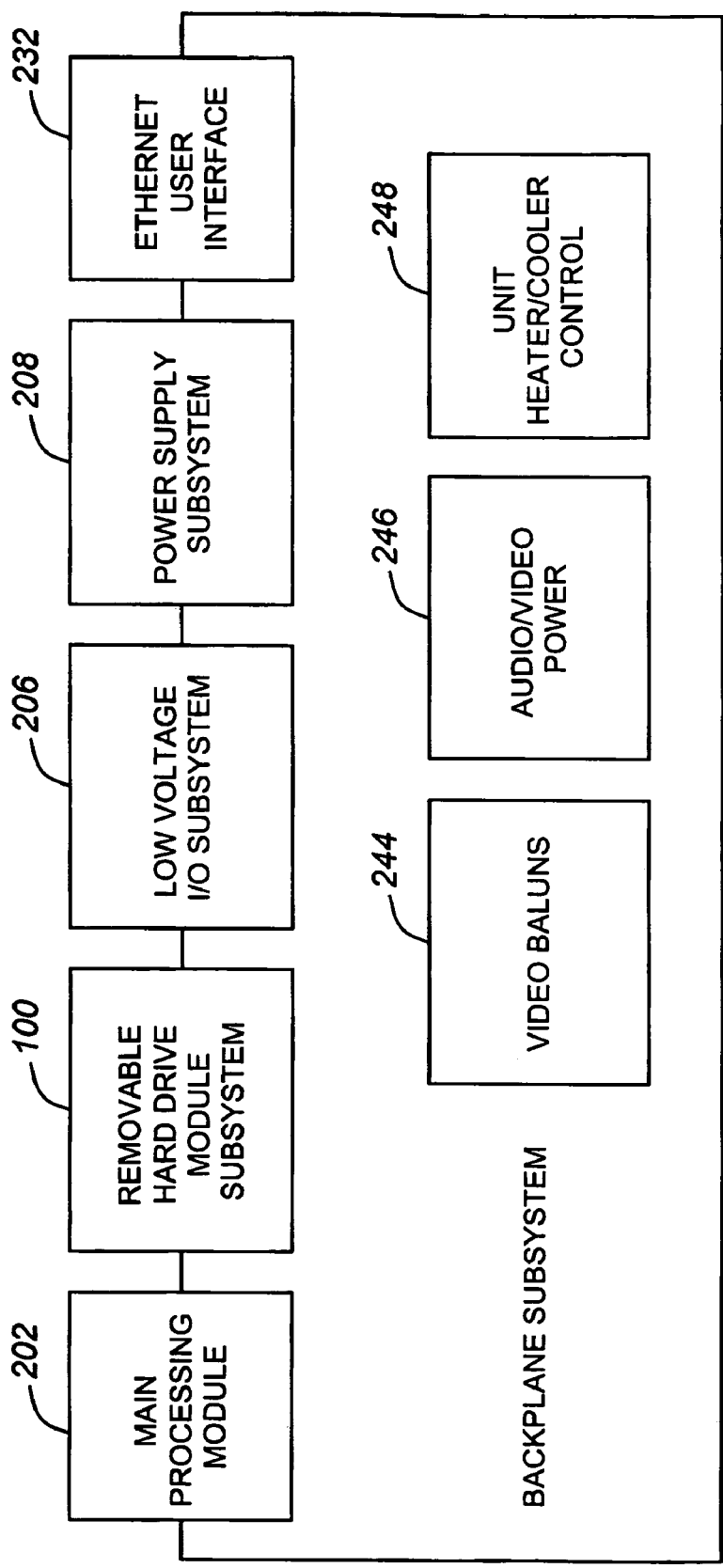
FIG. 8 is a block diagram of a backplane subsystem according to an embodiment of the present invention.

FIG. 8 is a block diagram of a backplane subsystem according to an embodiment of the present invention. FIG. 5 illustrates a relationship between the backplane subsystem 204 and the following other components: main processing module 202; removable hard drive module 100; low voltage I/O subsystem 206; power supply 208; and Ethernet user interface 232. FIG. 8 also shows that the backplane subsystem 204 can include one or more components. A video balun 244 can be provided. A balun is a transformer connected between a balanced source or load and an unbalanced source or load. A balanced line has two conductors with equal currents in opposite directions. An unbalanced line has just one conductor; the current in it returns via a common ground or earth path. An audio/video power supply 246 can be provided, in order to supply power required to record audio/video. A unit heater/cooler (temperature) control 248 can be provided. The unit temperature control 248 can be provided as the temperature control logic, such as an electronic thermostat control, for controlling the thermoelectric module 112, as discussed earlier.

All electrical connections to the Removable Hard Drive Module subsystem are preferably routed through a single connector (blind-mate capable) to the Backplane Subsystem for distribution other subsystems. The connector can include blind mate pin alignment features.

Regarding the physical/electrical interface of the hard drive module to the backplane, the hard drive module connector can be Female to reduce issues associated with Immunity when hard drive module is removed from the system. Due to the electrically sensitive nature of this module, all electrical connections on this interface are preferably preconditioned low voltage signals.

In other words, according to an embodiment of the present invention there is provided a mobile event recorder data pack for use in a vehicle, the vehicle operating within a vehicle operating temperature range. The data pack includes a main processing module, and a contained environmental control system for a hard drive. The system includes a housing for enclosing the hard drive. The system also includes a thermoelectric module coupled to and provided within the housing and for coupling to the hard drive. The thermoelectric module is for transferring heat between the hard drive and the housing in response to an applied voltage in order to maintain a hard drive temperature within a hard drive operable temperature range. The vehicle operating temperature range includes temperatures outside the hard drive operable temperature range. The hard drive operable temperature range can be within the vehicle operating temperature range. The data pack also includes a backplane system for interfacing the main processing module with the contained environmental control system.

The mobile event recorder data pack can include an event recorder interface for coupling the mobile event recorder data pack with an event recorder. The mobile event recorder data pack can include means for selecting an external time synchronization source.

Mobile Event Data Recorder

Embodiments of the present invention provide the ability to add audio and video feeds to information measured and recorded by an event recorder. Embodiments of the present invention destined for use in the rail industry, such as in trains, are preferably built in accordance with the 4MCU package which is a standard format for rail. Typically, rack positions are available within the train. Units according to an embodiment of the present invention are mounted within such racks.

Figure 9:
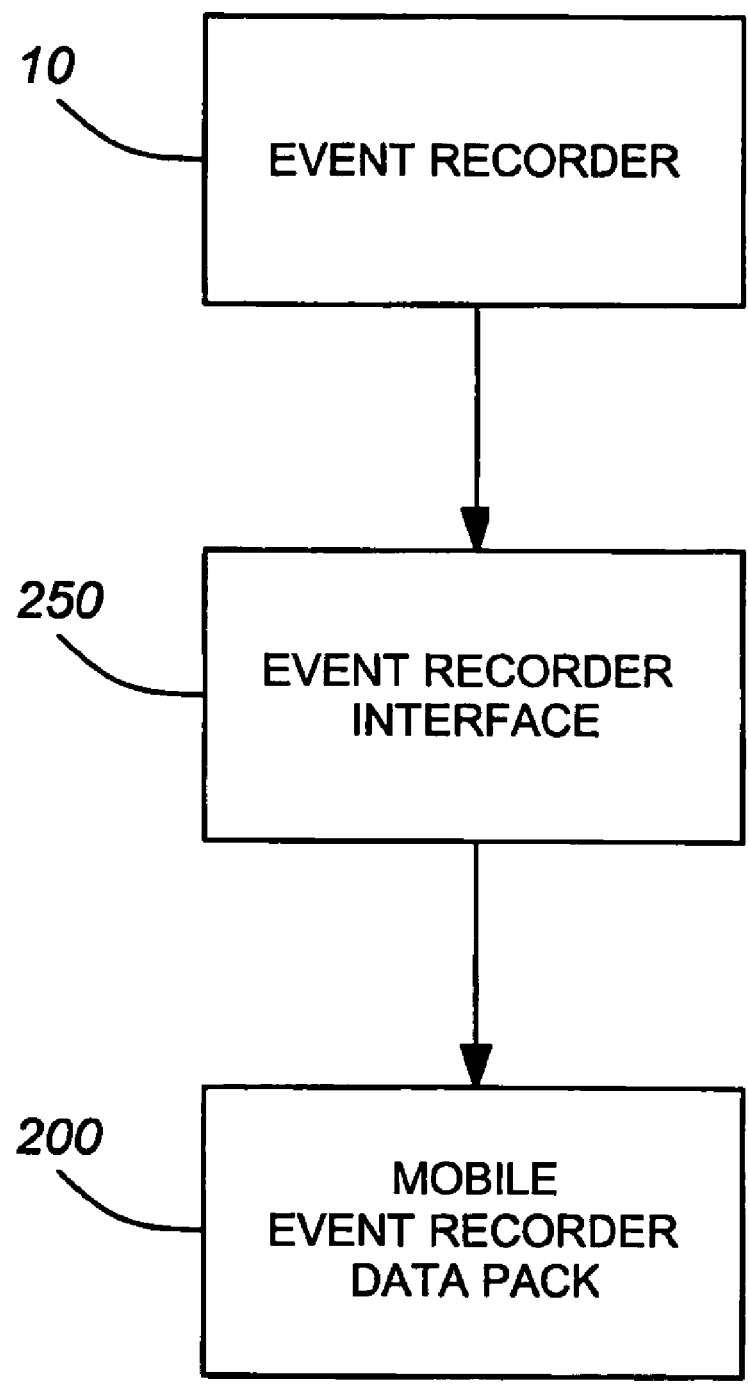
FIG. 9 is a block diagram illustrating an event recorder and a mobile event recorder data pack according to an embodiment of the present invention.

FIG. 9 is a block diagram illustrating a mobile event data recorder according to an embodiment of the present invention, including an event recorder 10 and a mobile event recorder data pack 200. Integration of the event recorder 10 and the mobile event recorder data pack 200 is provided via an event recorder interface 250. The interface 250 includes a time synchronization means, or time synchronizer, to synchronize communication between the two blocks. The time synchronizer is functionally provided in the interface 250 between the event recorder 10, which records all of the operator inputs, and data (such as video and audio) recording components of the mobile event recorder data pack 200. The time synchronizer, although typically provided in the interface 250, can be provided within the mobile event recorder data pack 200. Similarly, the event recorder interface 250 can itself be provided within the mobile event recorder data pack 200.

The time synchronizer can be provided in hardware, firmware, software, or a combination thereof. A particular embodiment can be provided as part of a user interface available, for example, from a DVR Time Settings option in a DVR Properties section of a DVR Configuration Tool. Options for selection of time synchronization source can include: Event Recorder (Serial 1), and GPS (LAN/Serial). In each case, it is only necessary to choose the device to synchronize with from the list.

Embodiments of the present invention can be added as a retrofit to existing event recorders. This is illustrated in FIG. 9 where the mobile event recorder data pack 200 is shown as a separate block. Alternatively, an enhanced event recorder can be provided according to embodiments of the present invention. Such a mobile event data recorder would include a mobile event recorder data pack 200 and an event recorder 10 in the same unit.

The mobile event recorder data pack 200 preferably includes the ability to provide video and audio recording and analysis of those recordings. Video and audio recorders can be provided by a digital video recorder (DVR) system such as provided by March Networks Corporation of Ottawa, Ontario, Canada. With respect to a video feed provided in accordance with embodiments of the present invention, such video is provided in one aspect looking forward from the front of the locomotive. Preferably, the camera for the video feed is only forward facing, and has a shield to insure that it is only facing outwards to the tracks.

The event recorder interface 250 provides a connection between the event recorder on the train, and the LDVR. This interface can be implemented as an RS-232 interface operating at 19200 bps, 8-N-1, with no flow control. Data transmitted over this interface can be sent as GPS style messages. In the case of time synchronization data, the message sent can be a "short form" GPRMC message with UTC time and date entries, a valid checksum, and all other fields left blank. In the case of a locomotive ID, the data will be transmitted as a GPLOC message, which contains the locomotive ID, followed by a valid checksum, in the following format: $GPLOC,<Locomotive ID>*<checksum>, with <Locomotive ID> preferably being an ASCII string of 10 or less characters.

In other words, according to an embodiment of the present invention there is provided a mobile event data recorder for use in a vehicle, the vehicle operating within a vehicle operating temperature range. The mobile event data recorder includes an event recorder clock source, a main processing module, and a contained environmental control system for a hard drive. The contained environmental control system includes a housing for enclosing the hard drive. The system also includes a thermoelectric module coupled to and provided within the housing and for coupling to the hard drive. The thermoelectric module is for transferring heat between the hard drive and the housing in response to an applied voltage in order to maintain a hard drive temperature within a hard drive operable temperature range. The vehicle operating temperature range includes temperatures outside the hard drive operable temperature range. The hard drive operable temperature range can be within the vehicle operating temperature range.

The mobile event data recorder further includes a backplane system for interfacing the main processing module with the contained environmental control system. The mobile event data recorder also includes a time synchronizer for synchronizing the digital video recorder with the event recorder clock source.

Other Applications

Embodiments of the present invention can also be integrated with an on board computer in order to provide monitoring of the state of the various on board systems. Embodiments of the present invention can be used in conjunction with digital video recording systems provided in high vibration environments. In the mass transit or public transit industry, a system according to embodiments of the present invention can be used rather than currently known approaches of isolating an entire recording unit. This provides the advantages that: a) the unit is smaller and can fit in a smaller envelope; and b) it is actually more effective because of better thermal and vibrational isolation according to embodiments of the present invention. Other embodiments of the present invention can be provided with additional seals in order to advantageously provide a waterproof unit.

In terms of other areas of application for a contained environmental control system according to embodiments of the present invention, military applications are likely applications that would benefit. Though embodiments of the present invention have been described primarily with respect to the DVR market, it is to be understood that such embodiments can be used in conjunction with other technologies.

A contained environmental control system according to an embodiment of the present invention can be used in the law enforcement industry, such as in police vehicles. Police automobiles operate at more extreme outdoor temperatures and therefore would benefit from the temperature control system provided according to embodiments of the present invention. As such, digital video recording systems could advantageously be used in a police car environment while used in conjunction with a self-contained environmental control system according to embodiments of the present invention. A fan may not be needed in such embodiments, since it can be possible to provide a heat sink with sufficient surface area for dissipating heat.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A mobile event recorder data pack system for use in a vehicle, the vehicle operating within a vehicle operating temperature range, the system comprising:
a chassis within which a hard drive module housing is sealed, the hard drive module housing comprising: a standard hard drive;
an insulating container containing the standard hard drive;
a thermoelectric module, coupled to and provided within the housing and for coupling to the hard drive, to transfer heat between the hard drive and the housing in response to an applied voltage in order to maintain a hard drive temperature within a hard drive operable temperature range, the vehicle operating temperature range including temperatures outside the hard drive operable temperature range, and the hard drive operable temperature range being within the vehicle operating temperature range;
a heat sink coupled to the thermoelectric module and to the housing to dissipate heat from the thermoelectric module to the housing;
an active cooling system for actively drawing heat away from the hard drive, out of the housing and to the interior of the chassis; and
a mechanical vibration isolator coupled to the hard drive and to the housing to reduce vibrational effects on the hard drive in order to maintain operation within a hard drive vibration limit.

2. The system of claim 1 wherein the active cooling system comprises a fan.

3. The system of claim 1 wherein the mechanical vibration isolator comprises a wire rope isolator.

4. The system of claim 1 further comprising a desiccant pack provided within the insulating container.

5. The system of claim 1 further comprising a thermal spreader provided in contact with the hard drive and the thermoelectric module to facilitate thermal conduction between the hard drive and the thermoelectric module.

6. The system of claim 5 further comprising a thermal transfer material provided between the thermal spreader and the thermoelectric module.

7. The system of claim 1 further comprising a thermal transfer material provided between the thermoelectric module and the heat sink.

8. The system of claim 1 further comprising an air gap sealing means provided on the periphery of an upper surface of the heat sink to seal an interface between the insulating container and the heat sink.

9. The system of claim 1 further comprising temperature control logic including a means for applying a voltage to the thermoelectric module.

10. The system of claim 9 further comprising means for activating the temperature control logic in response to a detection of a housing temperature in excess of an upper device operating temperature.

11. The system of claim 10 further comprising a temperature sensor located on the thermal spreader for detection of the temperature of the thermal spreader.

12. The system of claim 1 further comprising:
a main processing module; and
a backplane system to interface the main processing module with the hard drive module housing and components contained therein.

13. The system of claim 12 further comprising an event recorder interface to couple the mobile event recorder data pack with an event recorder.

14. The system of claim 13 wherein the event recorder interface comprises:
a time synchronizer to synchronize communication between the event recorder and the mobile event recorder data pack.

15. The system of claim 1 wherein the chassis is an aluminum chassis.

* * * * *